(12) United States Patent
Jankowski et al.

(10) Patent No.: US 8,113,915 B2
(45) Date of Patent: Feb. 14, 2012

(54) GRINDING WORM, PROFILING GEAR AND PROCESS FOR THE PROFILING OF THE GRINDING WORM

(75) Inventors: Ralf Jankowski, Bad Sackingen (DE); Roland Schmid, Wil (CH); Dieter Nobs, Zurich (CH); Michael Siebert, Wallisellen (CH); Wolfgang Thyssen, Bad Sackingen (DE)

(73) Assignee: Reishauer AG, Wallisellen (CH)

( * ) Notice: Subject to any disclaimer, the term of this patent is extended or adjusted under 35 U.S.C. 154(b) by 1141 days.

(21) Appl. No.: 11/111,883

(22) Filed: Apr. 22, 2005

(65) Prior Publication Data

US 2005/0239385 A1   Oct. 27, 2005

(30) Foreign Application Priority Data

Apr. 22, 2004  (DE) .......................... 10 2004 020 238
Nov. 29, 2004  (DE) .......................... 10 2004 057 596

(51) Int. Cl.
*B24B 1/00* (2006.01)
(52) U.S. Cl. ................ 451/47; 451/56; 451/57; 451/65; 451/253; 451/443; 451/900
(58) Field of Classification Search .................... 451/56, 451/5, 8, 47, 172, 253, 11, 57, 58, 65, 219, 451/443, 547, 900; 125/11.01, 11.04
See application file for complete search history.

(56) References Cited

U.S. PATENT DOCUMENTS

| 1,712,095 | A | * | 5/1929 | Schurr | .............................. 72/102 |
| 1,832,507 | A | * | 11/1931 | Schurr | ........................... 451/275 |
| 1,877,104 | A | * | 9/1932 | Wildhaber | ...................... 407/26 |
| 2,077,100 | A | * | 4/1937 | Edgar | .............................. 451/49 |
| 2,607,175 | A | * | 8/1952 | Osplack | ........................... 451/47 |
| 2,624,159 | A | * | 1/1953 | Balsiger | ........................ 451/242 |
| 2,776,529 | A | * | 1/1957 | Osplack | ........................... 451/47 |
| 3,713,315 | A | * | 1/1973 | Meyer et al. | ................... 72/100 |
| 3,740,904 | A | * | 6/1973 | Ainoura | ........................... 451/47 |
| 4,119,079 | A | * | 10/1978 | Junker | ....................... 125/11.03 |
| 4,149,343 | A | * | 4/1979 | Feldmeier | ........................ 451/63 |
| 4,417,422 | A | * | 11/1983 | Redeker et al. | ............... 451/143 |
| 4,475,319 | A | * | 10/1984 | Wirz | ................................ 451/5 |
| 4,677,962 | A | * | 7/1987 | Loos et al. | ................. 125/11.03 |
| 4,850,155 | A | | 7/1989 | Sulzer | |
| 4,961,289 | A | | 10/1990 | Sulzer | |
| 5,175,962 | A | | 1/1993 | Pedersen | |
| 5,209,020 | A | * | 5/1993 | Feisel | .............................. 451/11 |
| 5,379,554 | A | * | 1/1995 | Thurman et al. | .............. 451/177 |

(Continued)

FOREIGN PATENT DOCUMENTS

CN     1046649 C   * 11/1999

(Continued)

OTHER PUBLICATIONS

The Patent Office of the People's Republic of China—Notification of the First Office Action received Feb. 19, 2008.*

*Primary Examiner* — Eileen P. Morgan
(74) *Attorney, Agent, or Firm* — Browdy and Neimark, PLLC (57) ABSTRACT

A grinding worm for the continuous generation grinding of a work piece is provided with mutually overlapping rough grinding and finish grinding zones arranged along the worm's axis, the finished grinding zone being provided with a three-dimensionally modified flank geometry having a width related design.

22 Claims, 11 Drawing Sheets

U.S. PATENT DOCUMENTS

| | | | |
|---|---|---|---|
| 5,395,189 A * | 3/1995 | Schriefer | 409/32 |
| 5,573,449 A * | 11/1996 | Mackowsky | 451/47 |
| 5,888,129 A * | 3/1999 | Neff | 451/541 |
| 5,890,950 A * | 4/1999 | Faulstich | 451/47 |
| 5,954,568 A * | 9/1999 | Wirz | 451/47 |
| 6,012,972 A | 1/2000 | Jankowski | |
| 6,077,150 A | 6/2000 | Jankowski | |
| 6,146,253 A * | 11/2000 | Litvin et al. | 451/47 |
| 6,217,409 B1 * | 4/2001 | Stadtfeld et al. | 451/5 |
| 6,257,963 B1 * | 7/2001 | Thyssen | 451/47 |
| 6,302,764 B1 * | 10/2001 | Wirz | 451/11 |
| 6,481,307 B1 * | 11/2002 | Klingelnberg | 74/459.5 |
| 6,491,568 B1 * | 12/2002 | Jankowski | 451/5 |
| 6,517,772 B1 * | 2/2003 | Woolf | 419/28 |
| 6,709,318 B2 * | 3/2004 | Giurgiuman et al. | 451/47 |
| 6,736,700 B2 * | 5/2004 | Bollinger et al. | 451/5 |
| 6,739,954 B2 * | 5/2004 | Stocker | 451/57 |
| 6,951,501 B2 * | 10/2005 | Tan | 451/5 |
| 2003/0031522 A1 * | 2/2003 | Bollinger et al. | 409/100 |
| 2004/0005843 A1 * | 1/2004 | Breitschaft et al. | 451/47 |
| 2004/0235401 A1 * | 11/2004 | Schauer | 451/72 |

FOREIGN PATENT DOCUMENTS

| | | | |
|---|---|---|---|
| CN | 1074341 C | * | 11/2001 |
| DE | 3401 339 A1 | | 10/1984 |
| DE | 19624842 | | 1/1998 |
| DE | 19706867 | | 8/1998 |
| DE | 101 31 060 A1 | | 1/2003 |
| EP | 0278512 | | 8/1988 |
| EP | 1 219 372 A1 | | 3/2002 |
| JP | 5028096 A | | 3/1975 |
| JP | 59-030672 A | * | 2/1984 |
| JP | 60161024 A | | 8/1985 |
| JP | 63306819 A | | 12/1988 |
| JP | 7506301 A | | 7/1995 |
| JP | 2002-233914 A | | 8/2002 |
| WO | 9419135 A1 | | 9/1994 |
| WO | 95/00276 A1 | * | 1/1995 |
| WO | 95/24989 A1 | * | 9/1995 |
| WO | WO 95/24989 | | 9/1995 |

* cited by examiner

GRINDING WORM, PROFILING GEAR AND PROCESS FOR THE PROFILING OF THE GRINDING WORM

FIELD OF THE INVENTION

The invention concerns a grinding worm and a profiling gear, together with a process for the profiling of the grinding worm.

BACKGROUND OF THE INVENTION

In gear drive engineering the efforts to increase the power concentration and reduce noise emission of the gear units are leading more and more to gears units and individual gears with three-dimensionally, i.e. topologically modified tooth flanks. Thanks to such modifications, favourable tooth bearing and dynamic response behaviour of gear pairs in mesh can be achieved, although their tooth deformation alters under the variable loading. As a result of these efforts, gears are calculated, designed and manufactured which are provided with complex tooth flank modifications, e.g. in the form of tip and root relief, or of undulations which run parallel to the lines of contact of a gear pair.

With the familiar methods and tools applied in generation grinding with a cylindrical grinding worm, workpieces with such tooth flank modifications can only be produced within limits, i.e. with considerable residual deviations or very extensive profiling resources.

In EP-A-0'278'512 a cylindrical grinding worm is described with a pressure angle varying across the grinding worm width. This grinding worm permits the generation of spur and helical gears with crowned tooth flanks with or without bias. A disadvantage of this solution is the residual deviations that occur due to the arc shaped locus of the path of contact between grinding worm and workpiece tooth flank in conjugate reproduction. A further disadvantage is the small number of workpieces that can be ground per grinding worm profiling operation. For since the modified grinding worm zone is used both for rough and for finish grinding, the high wear suffered during rough grinding has a negative effect on the ultimate accuracy.

The last mentioned disadvantage is avoided in DE-A-197'06'867.7 (FIG. 1) in that the grinding worm is divided into several zones across its width, which are used separately for rough grinding and finish grinding. The grinding worm is profiled with a profile roll. On account of the given fixed profile of the profile roll, however, a considerable loss in usable grinding worm width is incurred at the transition between the rough and the finish grinding zone. The reasons for this are explained later in the text in more detail with reference to the FIGS. 1 to 2*a*.

DE-A-196'24'842 A1 and WO 95/24989 describe the generation of grinding worm profiles with radiussed form rolls, with which it is possible by continuous path control to produce practically any desired grinding worm thread profile. The disadvantage of these solutions lies chiefly in the necessarily long profiling times, so that they may be suitable for small and medium series, but not for large series production.

Also known is the production of cylindrical convex and concave crowning and globoidal geometry on worm type and gear type grinding tools with internal and external teeth, using an abrasive grain coated profiling gear. The grinding worm flank geometry derives from the conjugate reproduction of the tooth geometry of the profiling gear which, instead of the workpiece, is brought into mesh with the grinding worm, and of which the tooth geometry corresponds with that of the workpiece. A three-dimensionally modified grinding worm geometry can therefore also be produced by the diagonal generation profiling method, using an accordingly topologically modified profiling gear.

One of the disadvantages of profiling a grinding worm with a profiling gear lies in the fact that when manufacturing the workpieces the workpiece flank geometry can only be altered slightly or not at all. The reason for this is that once the relevant profiling gear is made, its geometry can only be altered slightly or not at all. This disadvantage and the high cost of a profiling gear makes the profiling of a grinding worm with a profiling gear only economical in large series production, where the desired workpiece geometry remains constant over long manufacturing periods, and the long life of an abrasive coated profiling gear can be fully exploited.

SUMMARY OF THE INVENTION

The object of the invention is therefore to provide a grinding worm with at least one arbitrarily three-dimensionally modified width zone, which said grinding worm affords an increased degree of exploitation of its worm width, where the flank geometry of the workpiece to be machined with this grinding worm can be altered more flexibly in production, and the profiling time nevertheless be kept short.

The grinding worm according to the invention is provided with at least one width zone for finishing and one width zone for roughing, which are arranged to mutually merge or overlap axially. The transition zone between the roughing and finishing zones is thereby minimized. The usable zone of the grinding worm is increased and the profiling time minimized.

Another object of the invention is to provide a profiling process and a profiling tool for profiling such a grinding worm.

The profiling process according to the invention and the profiling tool according to the invention are particularly suitable for large series manufacture.

The profiling gear according to the invention differs from the workpiece to be ground with respect to the characteristics facewidth and/or number of teeth and/or helix angle and/or tooth flank modifications.

Due to the particular design of the profiling gear, the flank geometry of the workpiece to be ground can be varied or corrected and the surface roughness of the grinding worm flanks adapted optimally to the demands of rough and finish grinding, without altering the flank geometry of the profiling gear.

In a preferred embodiment the profiling gear according to the invention has profiling width zones of differently shaped flank modifications. This profiling gear is preferably employed in the process according to the invention, by which the flank geometry of individual width zones of the profiling gear is transferred section for section to selected grinding width zones of the grinding worm by means of appropriate mutually allocated axial profiling strokes of the grinding worm and the profiling gear. This permits the flank geometry and surface roughness of the grinding worm zones to be produced individually according to their purpose.

The invention combines the advantages of the capacity to generate three-dimensional tooth flank modifications by means of a profiling gear with the division of the rough and finish grinding zones across the grinding worm width.

By suitable selection of the diagonal ratio and the allocation of the width zones of the profiling gear to the grinding width zones of the grinding worm when profiling, it becomes possible, as mentioned above, to adapt the modifications of the grinding worm flanks to the needs of the workpiece without having to alter the flank geometry of the profiling gear.

A further object of the present invention is to provided a second process, by which grinding worms with mutually overlapping width zones and a three-dimensionally modified finishing zone can also be profiled economically in medium sized and small series manufacture.

According to the invention this object is attained by way of a profiling process in which in a first operation the grinding worm is profiled across its entire width in familiar manner with a profile dressing tool, and in a second operation the finishing zone and the transition zone between roughing and finishing zone are finish profiled by NC controlled line by line profiling, in particularly by means of a form dressing roll. Since the finishing zone is narrow relative to the total grinding worm width, and little material is removed in the second profiling operation, the time and resource expenditure required for this is only a fraction of that which would be incurred by line by line profiling of the entire grinding worm width.

BRIEF DESCRIPTION OF THE DRAWINGS

In the following the invention is explained in detail by way of a few preferred embodiments which are illustrated in the annexed drawings. The drawings depict:

FIG. 7b A side elevation of the profiling gear represented in FIG. 7a;

DETAILED DESCRIPTION OF PREFERRED EMBODIMENTS

Figure 1:
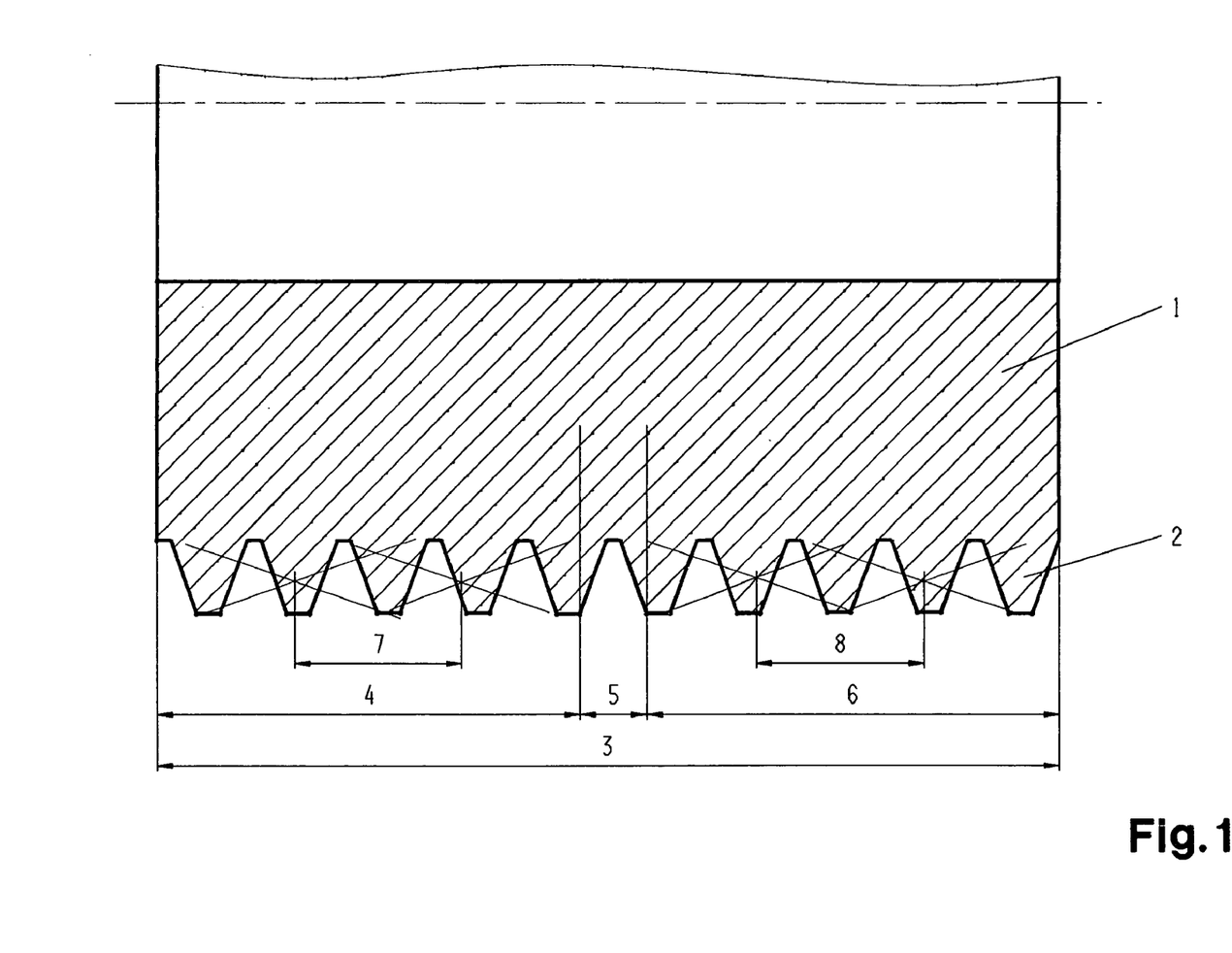
FIG. 1 A diagrammatic representation of part of a cylindrical grinding worm in axial section according to the background of the invention.
Figure 2:
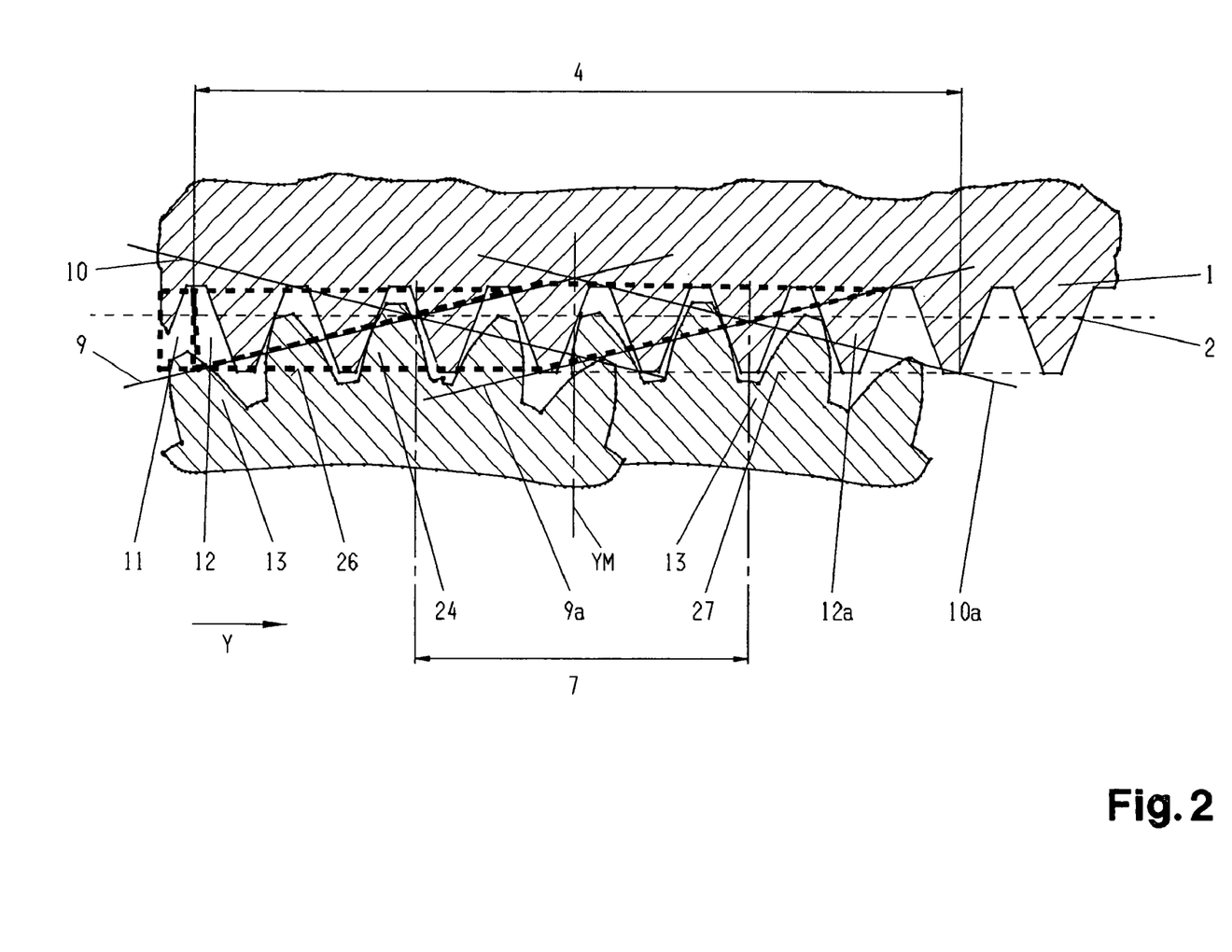
FIG. 2 A representation of part of the grinding worm according to FIG. 1 in mesh with a gear.
Figure 2A:
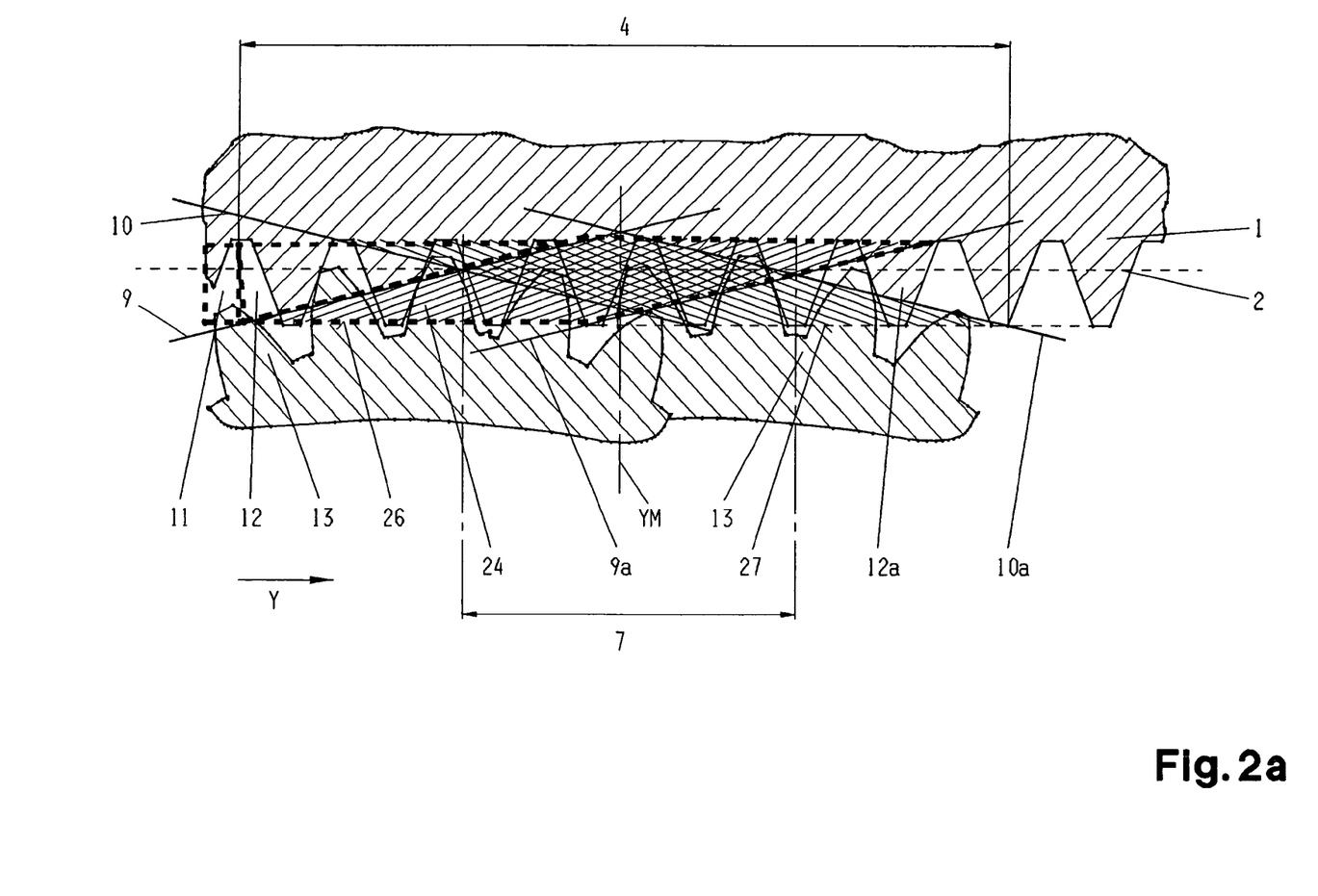
FIG. 2a The partial view shown in FIG. 2 emphasizing the useful zones of the grinding worm flanks.

In the FIGS. 1, 2a and 2b a part of a grinding worm is depicted such as corresponds with the background of the invention and such as is used for the continuous generation grinding of workpieces, in particular of the teeth of cylindrical spur and helical gears. It can be employed singly, or several grinding worms can be arranged coaxially one behind the other.

The grinding worm 1 is provided with a single or multi-start grinding worm profile 2 of cylindrical basic geometry. It has a total zone with a total width 3, the total zone being divided into a rough grinding zone 4, a transition zone 5 and a finish grinding zone 6.

It is also possible to employ separate grinding worms for rough grinding and for finish grinding. In this case the width of the rough grinding worm corresponds with the rough grinding zone width 4, and the width of the finish grinding worm with the finish grinding zone width 6. The distance between the rough and the finish grinding worms represents the transition zone 5.

In the background to the invention, rough grinding and finish grinding are performed by the known tangential process, i.e. a step by step shift offset, or the diagonal process (also termed shift grinding process), i.e. a continuous shifting during the grinding stroke.

Although with this process the entire rough grinding zone 4 is used, the usable roughing shift width 7 is considerably smaller. In finish grinding as well, the whole finish grinding zone 6, i.e. the whole width of the finish grinding worm is used. But here too the usable finishing shift width 8 is limited to a smaller zone.

If the grinding worm flanks of the finishing zone are modified three-dimensionally, the above mentioned transition zone 5 is additionally required, across the width of which the change is made from the rough grinding worm profile to the finish grinding worm profile, and which is used neither for rough grinding nor finish grinding.

The cause of the above mentioned limits of the usable roughing shift width 7 and finishing shift width 8 is explained below, referring to FIG. 2 and using the rough grinding zone 4 as an example.

The engagement of the grinding worm profile 2 of the grinding worm 1 with the teeth of a workpiece or the teeth of a profiling gear 13 takes place in similar manner as between a toothed rack and a gear, namely along lines of action 9, 9a and 10, 10a. In their axial projection, ie. across the grinding worm width, the points of contact lying on these lines of action 9, 9a and 10, 10a alter their position relative to the tooth depth. Referring to the thread of the grinding worm 1 the locus of the lines of action 9, 9a, 10, 10a is spiral shaped in the end face projection, and of tapered screw shape in the projection on the axial section plane. At the facial ends of the grinding zone, this locus results in zones on the grinding worm thread flanks in which no engagement occurs. These zones are designated in the following as lost zones 12, 12a. In FIG. 2 a first lost zone 12 is depicted which occurs at the left end of the rough grinding zone 4 of the grinding worm 1 due to the locus of the line of action 9 for generating the right flank of the workpiece. Similarly in mirror image about the grinding zone centre line YM a lost zone 12a occurs at the right end of the rough grinding zone 4 due to the locus of the line of action 10a for generating the left flank. These lost zones 12, 12a occur again analogously at the ends of the finish grinding zone 6. Additionally at the end faces of the grinding worm 1 there is a third lost zone 11 for the run-out of the grinding worm thread.

Analogous to FIG. 2, FIG. 2a depicts usable zones 26, 27 on the right and left flanks of the grinding worm thread of the rough grinding zone 4, where a first usable zone 26 is bounded by the lines of action 9 and 9a, and a second usable zone 27 by the lines of action 10, 10a.

If the grinding zone 4 is applied in the continuous diagonal generation grinding process, during the axial displacement of the grinding worm through the roughing shift width 7 while simultaneously performing the grinding or profilinf stroke, the lines of action 9 and 10 wander through a diagonal grinding zone 24 to 9a and 10a respectively. This diagonal grinding zone 24 is indicated in FIG. 2a by shading. By this means the grinding worm thread modification are reproduced along the lines of action in known manner on the workplace tooth flanks, the lines of action 9, 10 being allocated to the first end of stroke position and the lines of action 9a, 10a to the second end of stroke position.

The ratio between the shift stroke and the grinding or profiling stroke is termed the diagonal ratio, where Dd designates the diagonal ratio when profiling and Ds the diagonal ratio when grinding the workpiece.

The invention exploits the finding described above that towards the extremities of the zones the grinding worm flanks are not used over the entire thread depth.

Figure 3:
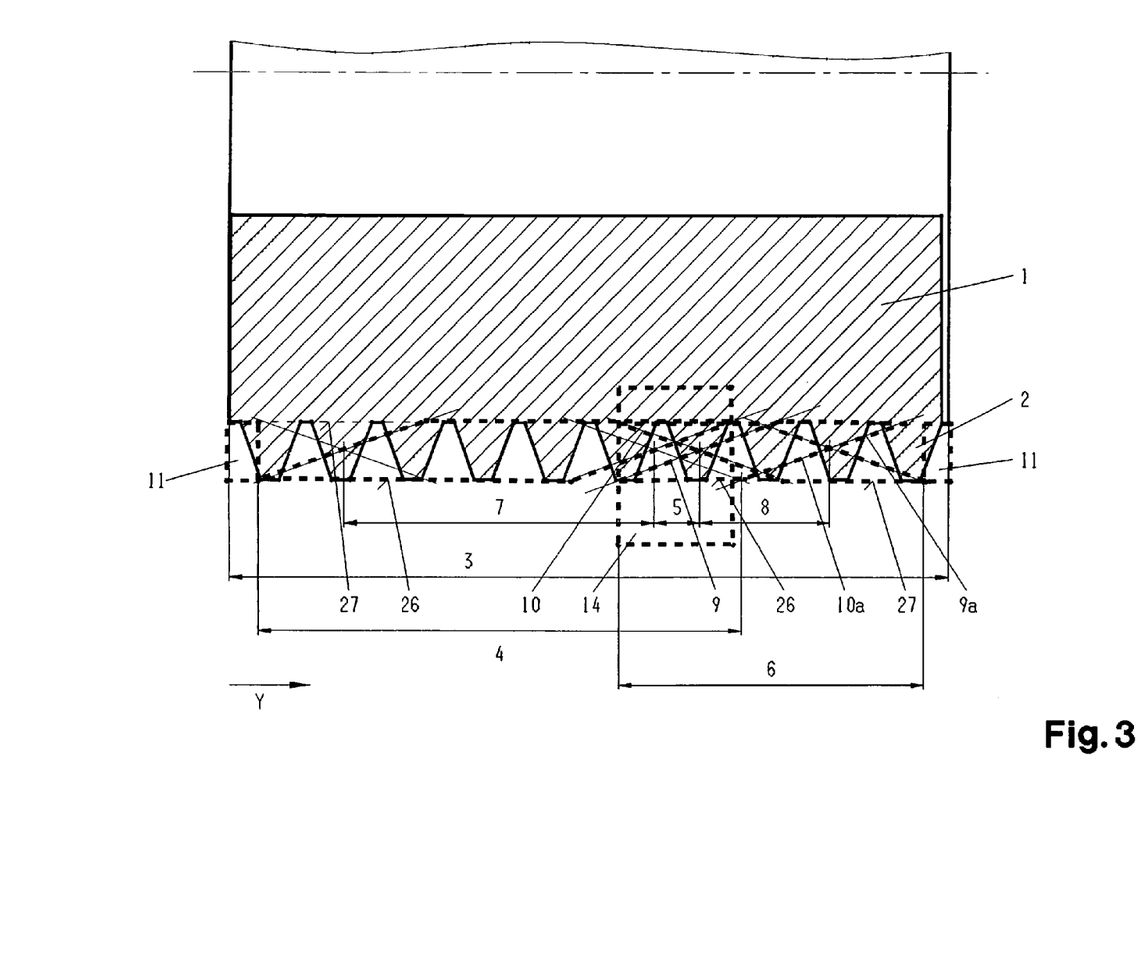
FIG. 3 A diagrammatic representation of part of a grinding worm according to the invention in axial section with width zones overlapping in the axial direction.
Figure 4:
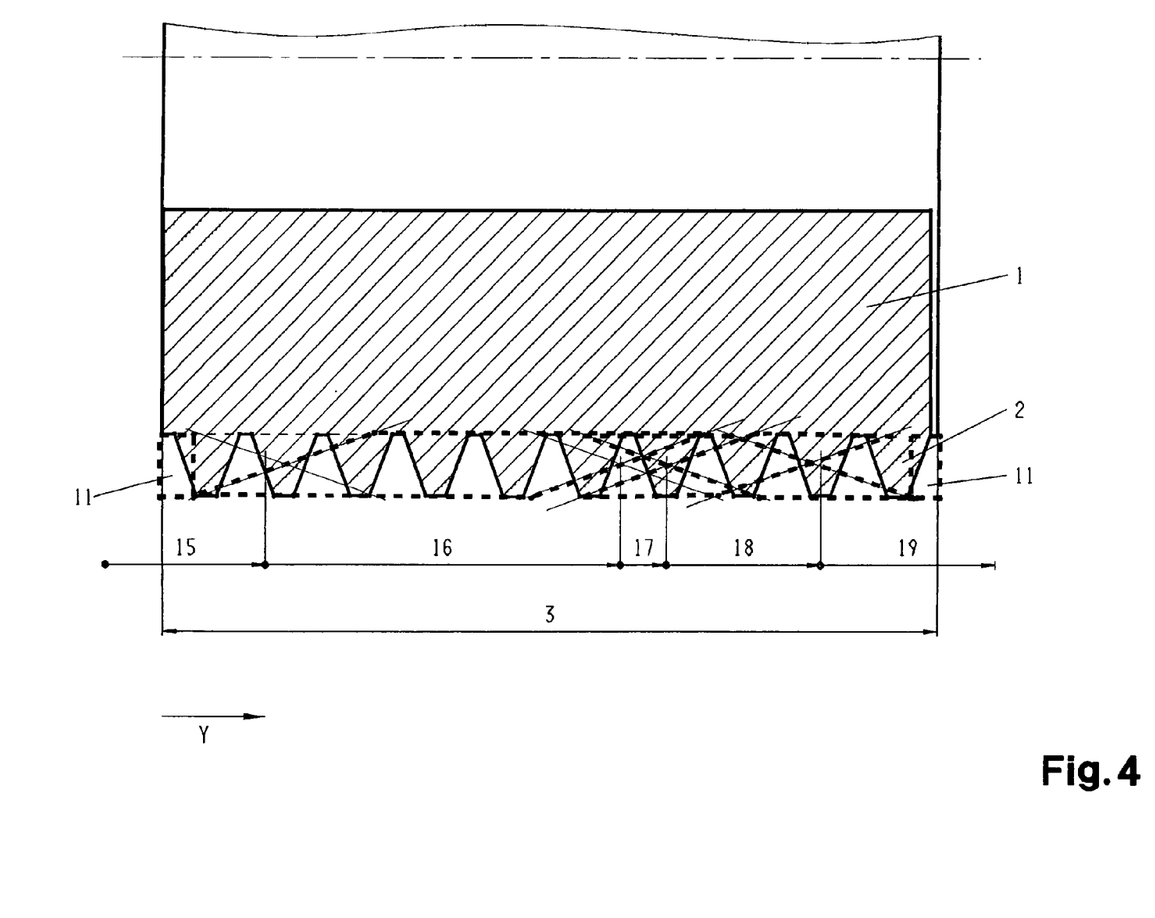
FIG. 4 The grinding worm according to FIG. 3, showing shift zones involved when profiling the grinding worm.

FIGS. 3 and 4 depict a part of a single or multi-start, essentially cylindrical grinding worm according to the invention, which is suitable for the continuous generation grinding of workpieces, in particular of spur and helical gears. This also is provided with a rough grinding zone 4 and a finish grinding zone 6. In accordance with the invention, however, the rough grinding zone 4 and the finish grinding zone 6 merge together in a superpositional zone 14, i.e. they overlap. Thereby the usable zones 26, 27 of the left and right flanks of the rough grinding zone 4 and the finish grinding zone 6 also overlap in a superpositional zone 14. This superpositional zone is drawn in FIG. 3, represented by a dotted rectangle. In this superpositional zone 14 the grinding worm thread profile is determined over its thread depth partly by the rough grinding and partly by the finish grinding profile. The relevant finish grinding profile can be three-dimensionally modified according to the specifications. This axial arrangement of the rough grinding zone 4 and the finish grinding zone 6 is optimized for maximum gain. By the superpositioning of the usable zones 26, 27 the portion of the grinding worm thread flanks not used for grinding is restricted to the smallest necessary. The transition zone 5 described above is reduced to a minimum. The transition zone 5 is ramp shaped.

Referring to FIG. 3 it becomes clear that in the superpositional zone 14 of the rough and finish grinding zones 4, 6, the grinding worm thread profile varies over the thread depth in the axial direction. The manufacturing process and the tool employed for the manufacture will be discussed later in the text.

By applying a suitable profiling process, in particular that according to the invention, it is possible to produce on the grinding worm thread in the usable zones 26, 27, between the lines of action 9 and 9a and 10 and 10a of the rough grinding zone 4 and the finish grinding zone 6, practically any desired three-dimensional flank modification. The dimensioning of the width of the finish grinding zone 6 is favourably based on a diagonal ratio Ds between shift stroke and grinding stroke equal to Ds=0 to Ds=1.5. Thereby only a relatively small portion of the total grinding worm width 3 is required for the finish grinding zone 6, which, especially for the manufacture of the grinding worm by continuous path controlled line by line profiling, leads to short profiling times.

The manufacture of the grinding worm according to the invention is possible by means of a profiling roll set, comprising a profile dressing roll and radiussed form roll. As is known from DE 197'06'867, by means of continuous diagonal shift grinding a worm profile modified across the grinding worm width can be transferred to the workpiece teeth such that the workpiece tooth profile changes across the facewidth. This manner of manufacture is especially suitable for small series production.

Figure 5:
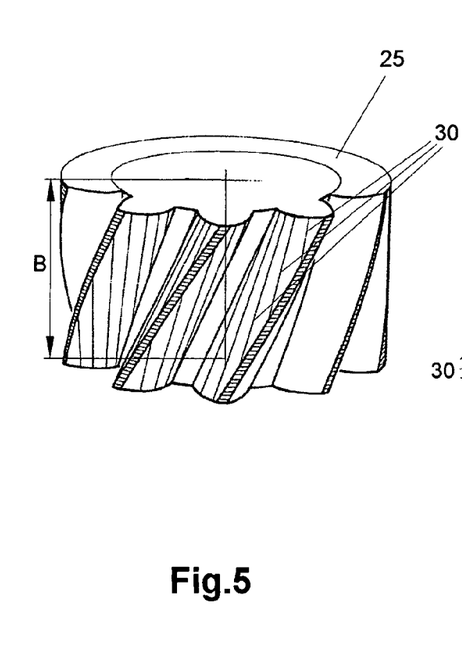
FIG. 5 A diagrammatic perspective representation of a profiling gear according to the invention.

Especially in large series production, however, the grinding worm is preferably profiled by means of a gear type or screw type profiling tool, particularly a profiling gear 25 according to FIG. 5. Such a profiling gear 25 is therefore discussed in the following.

This gear type profiling tool 25 is employed on the continuous generation grinding machine in familiar manner instead of the workpiece gear.

The profiling gear 25 employed to profile the grinding worm 1 according to the invention differs in at least one of the characteristics listed below from the corresponding characteristic of the workpiece to be machined by the grinding worm: tooth facewidth B, No. of teeth, helix angle, tooth flank modification.

It is preferably provided with at least two profiling width zones with differently designed flank modifications. This embraces at least one first profiling zone 29 for profiling the rough grinding zone 4 and at least one second profiling zone 28 for profiling the finish grinding zone 6 of the grinding worm 1. Preferably the first profiling zones 29 serve for producing all width zones of the grinding worm not used for finishing. At least one of the profiling zones 29, preferably the first profiling zone 29 is also suitable for profiling the transition zone 5. The connection between the profiling zones 28, 29 takes place by way of at least one modification ramp. Depending on the kind of embodiment the first profiling zones 29 are not modified or are modified two or three-dimensionally.

In a preferred embodiment the at least two different profiling width zones 28, 29 are coated with abrasive grains, which are of differing type and/or differing density and/or differing size. This thereby permits the production of optimum cutting properties for the grinding worm 1.

A description of various embodiments of the profiling gear 25 according to the invention is given in the following.

In a first embodiment the profiling gear 25 according to the invention has a facewidth B which is substantially greater than the facewidth of the workpiece to be machined with the grinding worm 1. Relative to the tooth flank modifications of the workpiece teeth, those of the profiling gear 25 are extrapolated axially according to the FIGS. 6a and 6b. These tooth flank modifications are shown in the figures in the form of grid lines.

Figures 6A, 6B:
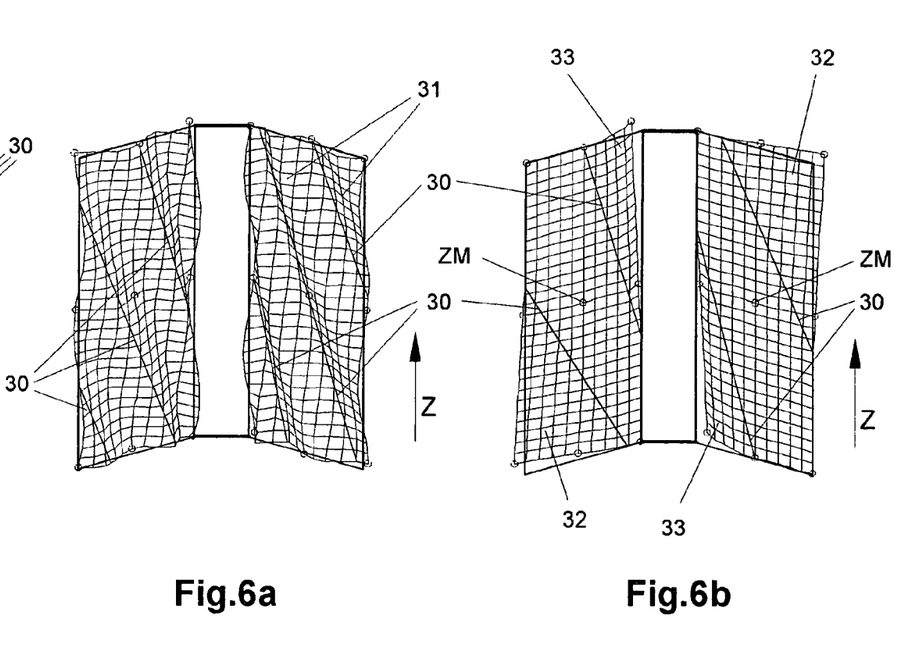
FIG. 6a A diagrammatic perspective representation of a flank geometry of a tooth space of the profiling gear according to FIG. 5, in a first embodiment.
FIG. 6b A diagrammatic perspective representation of a flank geometry of a tooth space of the profiling gear according to FIG. 5, in a second embodiment.

In the embodiment according to FIG. 6a the flank geometry, or flank modification consists of undulations 31 which run parallel to the lines of contact 30 of the profiling gear 25.

In the example shown in FIG. 6b the flank profile of the profiling gear 25 displays a tip relief 32 and a root relief 33, the extent of which alters in the facewidth direction parallel to the trace of the lines of contact 30.

Figure 6C:
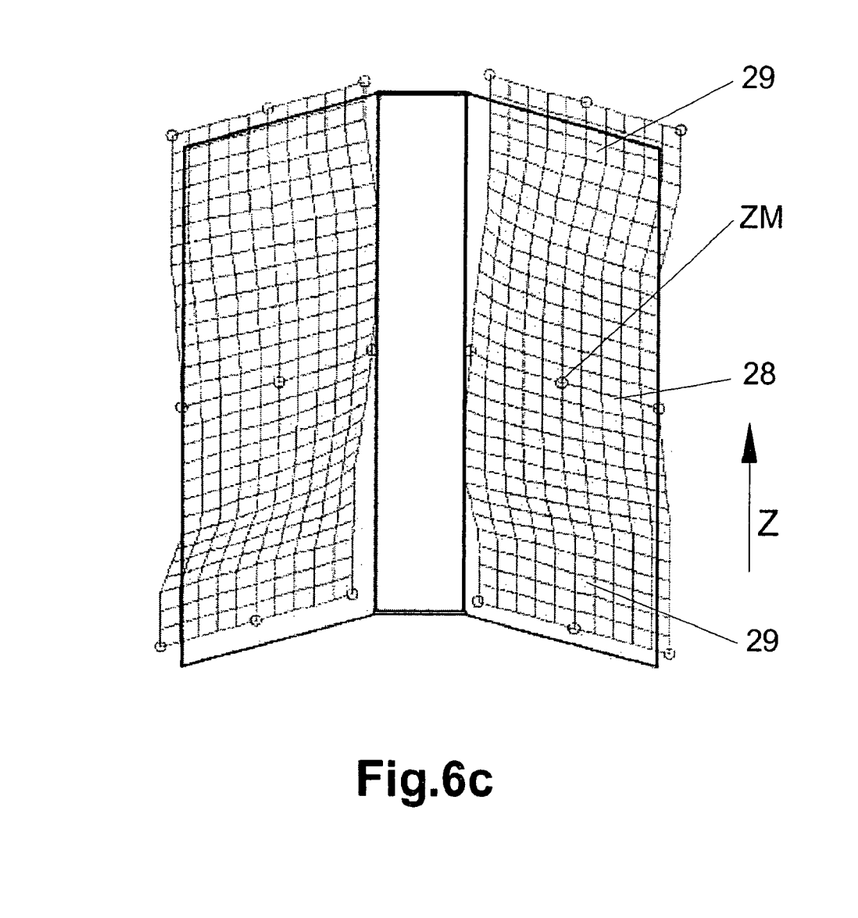
FIG. 6c A diagrammatic perspective representation of a flank geometry of a tooth space of the profiling gear according to FIG. 5, in a third embodiment.

FIG. 6c depicts a further preferred embodiment of a profiling gear 25. In the case of this profiling gear 25, only the middle width zone 28 is three-dimensionally modified. Only this width zone 28 is employed to produce the finish grinding zone 6. The two extremity width zones 29 of the profiling gear 25 are only modified two-dimensionally.

Figure 6D:
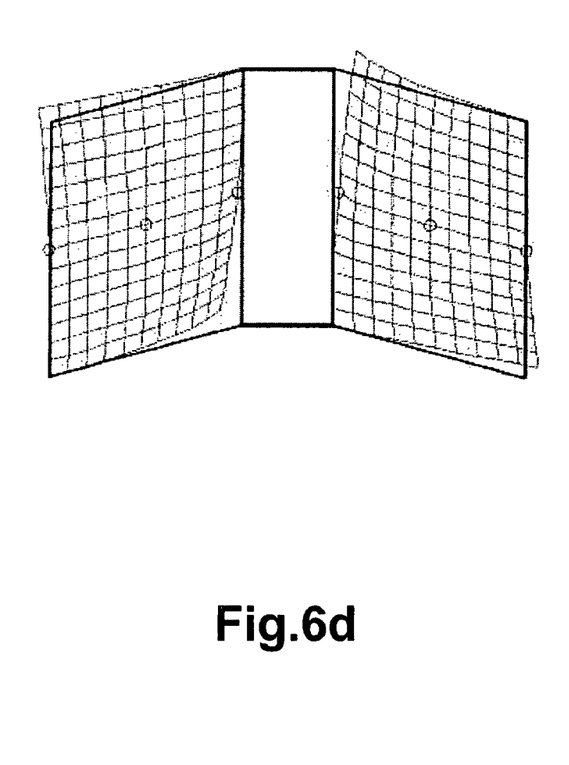
FIG. 6d A diagrammatic perspective representation of a tooth space of a workpiece which has been produced with a grinding worm which has been profiled with the profiling gear according to FIG. 6c.

FIG. 6d depicts the tooth space of a workpiece, i.e. a cylindrical gear, which has been made with a grinding worm profiled by means of the profiling gear according to FIG. 6c.

As is clearly discernible the workpiece and the profiling gear have different tooth flank modifications.

The profiling gears 25 described above are preferably employed to profile the grinding worm in a process according to the invention. In this process the grinding worm width zones according to FIG. 4, i.e. the rough grinding and the finish grinding zones 4 and 6 are produced by a special sequence of profiling strokes in the continuous diagonal generation process.

Corresponding respectively to each of the individual profiling strokes is a profiling shift stroke zone 15, 16, 17, 18, 19. The relevant shift direction is designated in the FIGS. 3 and 4 by an arrow and the denotation Y. The direction of the relevant axial stroke action of the profiling gear 25 is designated in the FIGS. 6a to 6c by an arrow and the denotation Z.

Allocated to each of these profiling shift stroke zones 15, 16, 17, 18, 19 are one or more width zones of the profiling gear 25. The reference number 15 designates the approach profiling shift stroke zone, 16 the rough profiling shift stroke zone, 17 the transition profiling shift stroke zone, 18 the finish profiling shift stroke zone, and 19 the run-clear profiling shift stroke zone.

Thus, e.g., a flank geometry of the profiling gear 25 according to FIG. 6a with its undulations 31 running parallel to its lines of contact 30 can be reproduced across the entire profiling gear width B on the shift stroke zones 15, 16 and 17 in one profiling stroke each, or in a single profiling stroke covering all three zones, where the diagonal ratio Dd and with it the relevantly reproduced profiling gear width B can differ from one shift stroke zone to another. In this manner by means of a profiling gear 25 with three-dimensional flank modifications it is also possible to produce on the grinding worm 1 a rough grinding zone 4 which is modified practically two-dimensionally only, since the effect of the three-dimensional modification of the profiling gear 25 is almost counteracted by the diagonal ratio Dd, which is greatly reduced compared to the shift stroke zone 18 for finish grinding.

With profiling gears 25 according to the FIGS. 6a, 6b and 6c it is for example possible, by means of an offset of a profiling stroke centre point ZM relative to a centre point YM of the finish grinding zone 6, to perform an axial displacement of the profiling gear modifications of profiling gear 25 and grinding worm 1. Furthermore by alteration of the diagonal ratio Ds it can be achieved that the three-dimensional modification of the profiling gear 25 is reproduced on the grinding worm threads in stretched or compressed form in the direction of the grinding worm width 3. With this and the above mentioned displacement of the stroke zones 16, 17, 18, 19 relative to each other, the opportunity is presented to correct the flank geometry of a workpiece machined by the grinding worm 1, without having to alter the flank geometry of the profiling gear used for profiling the grinding worm 1.

In a preferred variant of the process a middle width zone 28 of the flank geometry of the profiling gear 25 is reproduced in the shift stroke zones 15 and 16. Subsequently on the forward stroke the profiling gear width zone from this middle width zone 28 to the Z stroke reversal point near one of the end faces of the profiling gear in the transition shift stroke zone 17 is traversed. Then on the return stroke nearly the whole profiling gear width is traversed over the finishing shift stroke zone 18, and on the new forward stroke of the profiling gear 25 the run-clear shift stroke zone 19 is traversed.

If a profiling gear 25 according to FIG. 6c is employed, the two-dimensionally modified width zones 29 are used in the profiling shift stroke zones 15, 16 and 19. In this case the profiling of the entire grinding worm width 3 takes place in an X and a Z stroke direction only.

Instead of a profiling gear 25 according to FIG. 6c, a set of joined profiling gears can also be used, which are similarly designed.

A well known problem in the profiling of grinding worms 1 with a profiling gear 25 is the susceptibility to wear of the tooth tip 45 and the tooth root 46, which when profiling the root and tip cylinders respectively of the grinding worm 1 are considerably more highly stressed than the tooth flanks. Moreover due to the great forces issuing from the profiling of the tooth tip or tooth root, a negative influence on the accuracy of the flanks of the grinding worm thread can ensue.

Figure 7A:
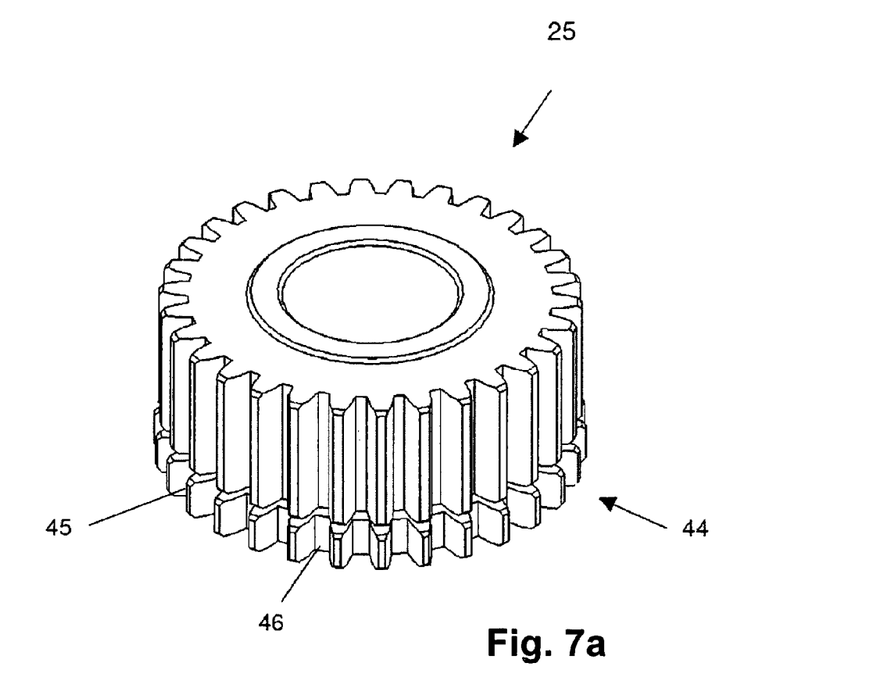
FIG. 7a A diagrammatic perspective representation of a profiling gear with additional zone.
Figure 7B:
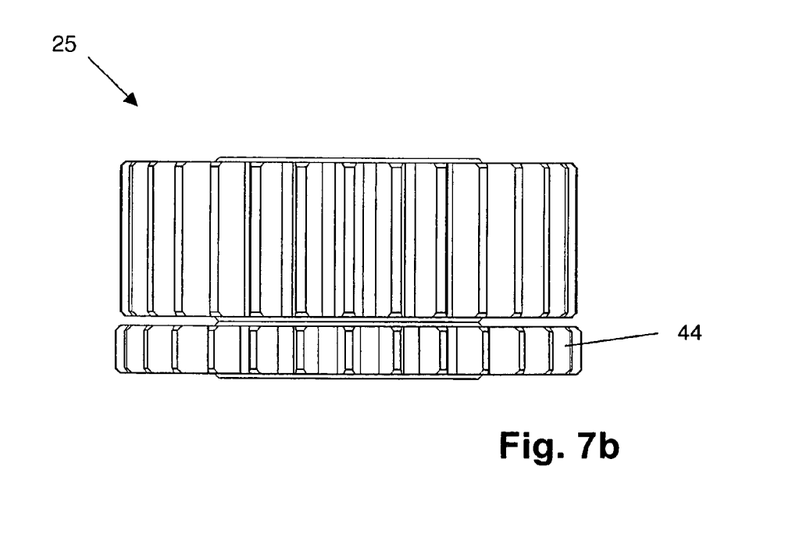
Figure 7C:
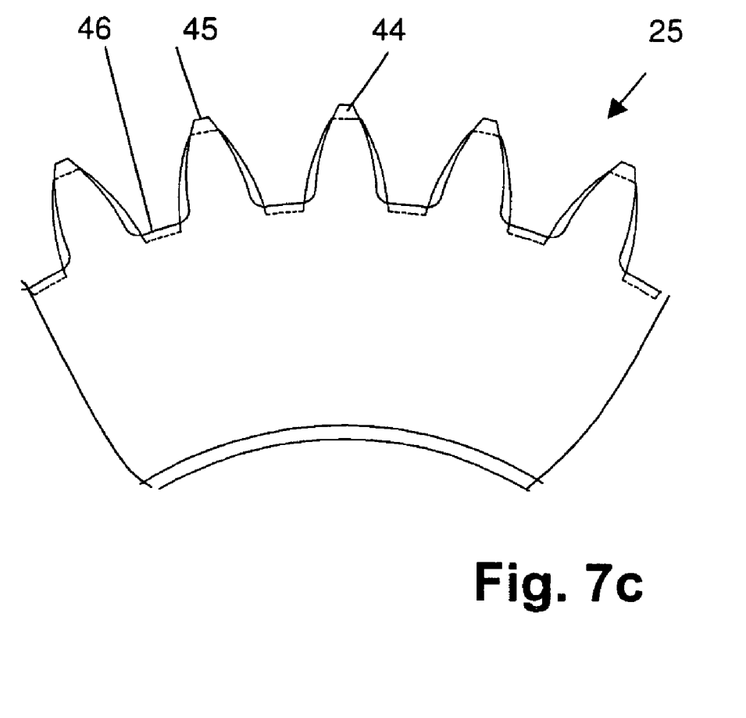
FIG. 7c A detail of a face view of the additional zone of the profiling gear represented in FIG. 7b.

In order to protect a profiling gear 25 from premature wear on tooth tip and tooth root, i.e. to avoid the negative influence on accuracy, the profiling gear 25 is provided according to the invention with an additional zone 44, which serves solely for the profiling of the root and tip cylinders of the grinding worm 1. A profiling gear 25 with an additional zone 44 is depicted in FIGS. 7a and 7b in diagrammatic perspective and side elevation respectively. It is made in one piece, or preferably as a set of two joined profiling gears. FIG. 7c shows a plan view portion of the additional zone 44.

In the additional zone 44 the tooth profile of the profiling gear 25 according to the invention is so designed that the tooth tip 45 and the tooth root 46 are on a larger diameter than the rest of the profiling gear, and that with the additional zone 44 in profiling action the flanks of the profiling gear only pre-cut the flanks of the grinding worm thread. By means of a special abrasive grain coating in the active tip and root zones 45, 46 of the additional zone 44, an increased wear resistance can be additionally provided for.

When profiling the grinding worm 1 the tip and root cylinders of the grinding worm are profiled with the additional zone 44 of the profiling gear 25 in a first preliminary operation which also pre-profiles the flanks of the grinding worm thread. The finish profiling of the grinding worm thread flanks is performed with the flanks of the diamond gear 25. This results in the tooth tip and root 45, 46 of the rest of the profiling gear not being subjected to load when finish profiling the grinding worm thread profile, and the loading when profiling the grinding worm thread flanks being minimized.

Figure 8A:
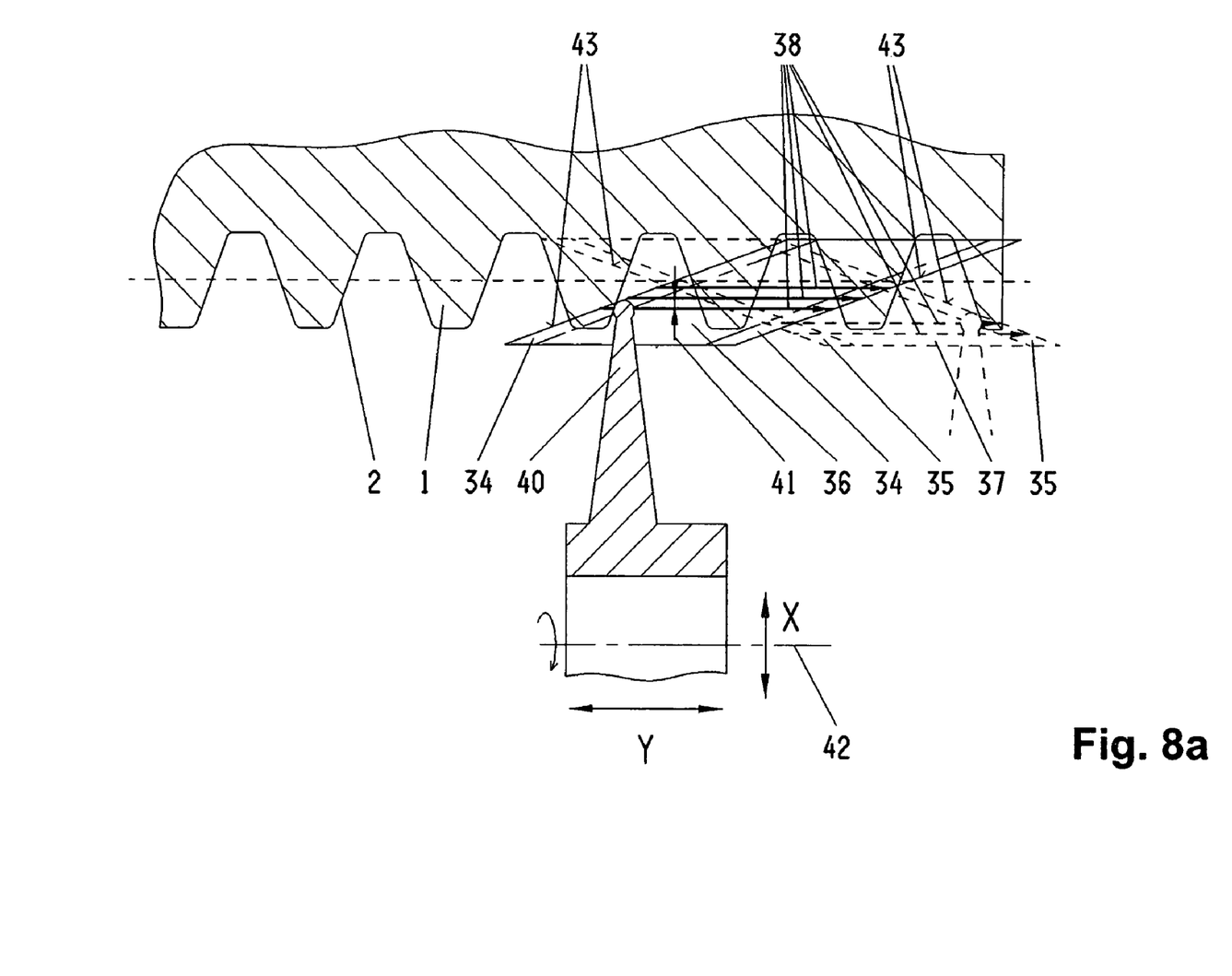
FIG. 8a A representation of part of the grinding worm according to FIG. 3 in engagement with a form dressing roll, in a first variant of a process according to the invention, and FIG. 8b A representation of part of the grinding worm according to FIG. 3 in engagement with a form dressing roll, in a second variant of a process according to the invention.
Figure 8B:
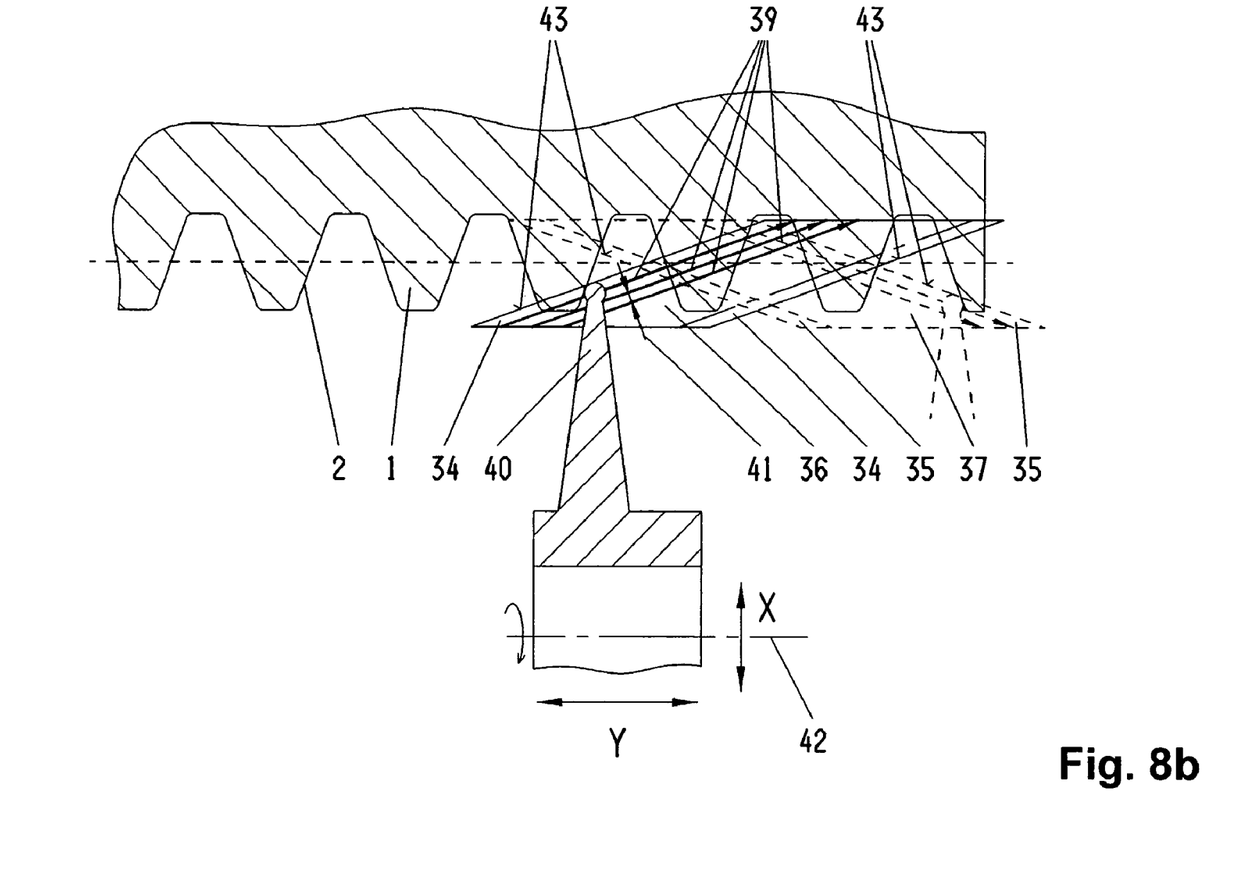

Referring to FIGS. 8a and 8b, a second process is described for profiling a grinding worm 1 according to the invention with overlapping roughing and finishing zones, which said process consists of two consecutive stages. In a first stage by means of a profile dressing tool not shown here, a constant topologically non-modified grinding worm profile 2 having the desired profile form of the roughing zone is generated in the familiar manner across the entire grinding worm width 3. In a second stage by means of a form dressing roll, a radiussed form roll 40 for example, rotating about an axis 42, the finishing zone 36 and the transition zones 34 of the first flank and then the finishing zone 37 and the transition zones 35 of the second flank are profiled by the well known NC line-by-line method line by line into the grinding worm profile produced in the first stage.

In a first process variant according to the invention, the axial method according to FIG. 8a, the profiling stroke motion of the form dressing roll 40 takes place in the Y direction parallel to the axis of rotation of the grinding worm. Starting and finishing points of the profiling stroke lines 38, which are displaced by one line space 41 in the infeed direction X after each profiling stroke, lie on the lines of action 43 of the grinding worm flanks, which lines constitute the outer borders of the transition zones 34 and 35.

In a second process variant according to the invention, the diagonal method according to FIG. 8b, the profiling stroke motion of the form dressing roll 40 follows the locus of the line of action. Starting and finishing points of the profiling stroke lines 39, which are displaced by one line space 41 at right angles to the lines of action after each profiling stroke, lie on the outer and inner enveloping surfaces of the grinding worm 1 which border the grinding worm profile.

A process variant not shown here is of course feasible, in which the profiling stroke motion takes place in the X direction at right angles to the axis of rotation of the grinding worm.

LIST OF REFERENCE NUMBERS

1 Grinding worm
2 Grinding worm profile
3 Grinding worm total width
4 Rough grinding zone
5 Transition zone
6 Finish grinding zone
7 Roughing shift width
8 Finishing shift width
9 Line of action of right flank, left end
9a Line of action of right flank, right end
10 Line of action of left flank, left end
10a Line of action of left flank, right end
11 Lost zone for grinding worm thread run-out
12 Lost zone for right flank, left end
12a Lost zone for left flank, left end
13 Workpiece or profiling gear teeth
14 Superpositional (overlap) zone
15 Approach profiling shift stroke zone
16 Rough profiling shift stroke zone
17 Transition profiling shift stroke zone
18 Finish profiling shift stroke zone
19 Run-clear profiling shift stroke zone
24 Diagonal grinding zone
25 Profiling gear
26 Usable zone of right flank
27 Usable zone of left flank
28 Middle width zone
29 End width zone
30 Line of contact
31 Undulation
32 Tip relief
33 Root relief
34 Transition zone right flank
35 Transition zone left flank
36 Finishing zone right flank
37 Finishing zone left flank
38 Axis parallel profiling stroke line
39 Diagonal profiling stroke line
40 Form dressing roll
41 Line space
42 Axis of rotation of the form dressing roll
43 Line of action
44 Additional zone
45 Tooth tip of additional zone
46 Tooth root of additional zone
B Facewidth
Y Shift stroke motion
YM Middle of grinding zone
Z Axial stroke motion of profiling gear
ZM Middle of profiling stroke
X Radial infeed direction

The invention claimed is:

1. An abrasive coated profiling gear for the profiling of a grinding worm for continuous generation grinding of a workpiece,
said profiling gear having a plurality of teeth spaced circumferentially around the gear,
said profiling gear provided with at least two profiling width zones along the length of said profiling gear, a first one of said profiling width zones being configured with tooth flank modifications that are different than the tooth flank modifications of at least a second of said profiling width zones, the first one of said profiling width zones being configured for profiling a rough grinding zone of the grinding worm, and the at least second one of said profiling width zones being configured for the profiling of the finish grinding zone of the grinding worm, and
wherein the at least one second profiling width zone being connected to the first profiling width zone by means of at least one modification ramp.

2. The profiling gear according to claim 1, wherein the rough grinding zone and the finish grinding zone of the grinding worm are arranged along an axis of the grinding worm,
wherein at least the finish grinding zone is provided with a three-dimensionally modified flank geometry,
wherein the rough grinding zone and the finish grinding zone mutually overlap along the axis and wherein the rough grinding zone has a usable roughing shift width and the finish grinding zone has a usable finishing shift width,
wherein between these two widths a transition zone is provided which is ramp shape profiled, and
wherein at least one of the profiling width zones of said profiling gear is configured to profile the transition zone.

3. The profiling gear according to claim 1, wherein the first profiling width zone of the profiling gear is a middle zone which is modified three-dimensionally, and wherein the at least one second profiling width zone is located at the face of the profiling gear.

4. The profiling gear according to claim 2, wherein the at least one second profiling width zone is configured to generate zones of the grinding worm not used for finishing.

5. The profiling gear according to claim 2, wherein the at least one second profiling width zone of the profiling gear has one of the features of the following group: not modified; modified two-dimensionally; modified three-dimensionally.

6. The profiling gear according to claim 1, wherein said profiling gear comprises a tooth flank profile having undulations parallel to lines of contact of said profiling gear, the lines of contact of a gear generally defined as the lines of flank contact between meshing gears.

7. The profiling gear according to claim 1, wherein at least one of the profiling width zones is provided with a tooth flank profile with tip and/or root relief, the extent of the tip and/or root relief altering across the facewidth parallel to the locus of the lines of contact of the profiling gear, the lines of contact of a gear generally defined as the lines of flank contact between meshing gears.

8. The profiling gear according to claim 1, wherein the at least two different profiling width zones are coated with abrasive grains of differing type, density and size.

9. The profiling gear according to claim 1, wherein the profiling gear has an additional zone with increased tooth tip and tooth root diameters, the tooth profile being configured so that, when profiling the tip and root cylinders of the grinding worm, the flanks of the grinding worm thread are only pre-machined.

10. The profiling gear according to claim 9, wherein the additional zone has a tip and a root zone which are coated with abrasive grains differing in type, density and size from the coating of the rest of the profiling gear.

11. The profiling gear according to claim 9, wherein the additional zone is coaxially spaced.

12. The profiling gear according to claim 1, wherein the profiling gear has a first end and a second end opposite to the first end along a longitudinal direction, and each tooth has at least one terminal end that ends at the first end of the profiling gear.

13. An abrasive coated profiling gear for the profiling of a grinding worm for continuous generation grinding of a workpiece,
    said profiling gear being provided with at least two profiling width zones along the length of said profiling gear, a first one of said profiling width zones being configured with tooth flank modifications that are different than at least a second of said profiling width zones, the first one of these profiling width zones being configured for profiling the rough grinding zone of the grinding worm, and at least a second one of these profiling width zones being configured for the profiling of the finish grinding zone of the grinding worm,
    said profiling gear being provided with an additional zone with increased tooth tip and tooth root diameters, the tooth profile being designed such that, when profiling the tip and root cylinders of the grinding worm, the flanks of the grinding worm thread are only pre-machined, and
    wherein said profiling gear is composed of a set of two profiling gear portions joined together.

14. The profiling gear according to claim 13, wherein the profiling gear has a first end and a second end opposite to the first end along a longitudinal direction, and each tooth has at least one terminal end that ends at the first end of the profiling gear.

15. The profiling gear according to claim 13, wherein the additional zone is coaxially spaced.

16. A process for the profiling of a grinding worm for the continuous generation grinding of a gear, comprising the steps of:
    providing a grinding worm with a rough grinding zone and a finish grinding zone arranged along an axis of the grinding worm,
    providing at least the finish grinding zone with a three-dimensionally modified flank geometry,
    mutually overlapping the rough grinding zone and the finish grinding zone along the axis,
    providing an abrasive coated profiling gear and profiling the grinding worm by a diagonal generation process,
    providing the profile gear with at least two profiling width zones, a first of said zones having flank modifications that are configured differently than the flank modifications of at least a second of said profiling width zones, the first one of these profiling width zones being configured for profiling the rough grinding zone of the grinding worm, and at least the second one of these profiling width zones being configured for the profiling of the finish grinding zone of the grinding worm, and
    transferring the flank geometries of individual width zones of the profiling gear section for section onto the grinding worm for profiling the rough and finish grinding width zones of the grinding worm by mutually allocated consecutive axial profiling strokes of the grinding worm and the profiling gear.

17. The process according to claim 16, further comprising arbitrarily selecting the diagonal ratio Dd between shift stroke and profiling stroke.

18. A process for the profiling of a grinding worm for the continuous generation grinding of a workpiece, comprising the steps of:
    providing a grinding worm with a rough grinding zone and a finish grinding zone arranged along an axis of the grinding worm,
    providing at least the finish grinding zone with a three-dimensionally modified flank geometry,
    mutually overlapping the rough grinding zone and the finish grinding zone along the axis of the grinding worm,
    providing an abrasive coated profiling gear and profiling the grinding worm by a diagonal generation process,
    transferring the flank geometries of individual width zones of the profiling gear section for section onto the grinding worm for profiling the rough and finish grinding width zones of the grinding worm by mutually allocated consecutive axial profiling strokes of the grinding worm and the profiling gear,
    wherein the flank geometry of a grinding width zone of the grinding worm is precisely modified by altering the diagonal ratio Dd between the axial profiling stroke of the grinding worm and of the profiling gear, and by axially displacing the strokes centres YM and ZM relative to one another.

19. A process for the profiling of a grinding worm for the continuous generation grinding of a workpiece, comprising the steps of:
    providing a grinding worm with a rough grinding zone and a finish grinding zone arranged along an axis of the grinding worm,
    providing at least the finish grinding zone with a three-dimensionally modified flank geometry,
    mutually overlapping the rough grinding zone and the finish grinding zone along the axis of the grinding worm,
    providing an abrasive coated profile gear and profiling the grinding worm by a diagonal generation process,
    transferring the flank geometries of individual width zones of the profiling gear section for section onto the grinding worm for profiling the rough and finish grinding width zones of the grinding worm by mutually allocated consecutive axial profiling strokes of grinding worm and profiling gear,
    providing the profiling gear with an additional zone, and profiling the tip and root cylinders of the grinding worm by the additional zone and pre-profiling the grinding worm flanks by the additional zone.

20. The profiling gear according to claim 19, wherein the additional zone is coaxially spaced.

21. A process for the profiling of a grinding worm, comprising the steps of:
    providing a grinding worm with a rough grinding zone and a finish grinding zone arranged along an axis of the grinding worm,
    providing a profile gear and profiling the grinding worm by a diagonal generation process,
    providing at least the finish grinding zone with a three-dimensionally modified flank geometry,
    mutually overlapping the rough grinding zone and the finish grinding zone along the axis of the grinding worm,
    providing the profile gear with at least two profiling width zones, a first of said zones having flank modifications that are configured differently than the flank modifications of at least a second of said profiling width zones, the first one of these profiling width zones being configured for profiling the rough grinding zone, and at least the second one of these profiling width zones being configured for the profiling of the finish grinding zone, transferring the flank geometries of the individual width zones of the profiling gear section for section onto the grinding worm for profiling of the rough and finish grinding width zones of the grinding worm by mutually allocated consecutive axial profiling strokes of grinding worm and profiling gear, and providing the profiling gear with an additional zone, and profiling the tip and root cylinders of the grinding worm by the additional zone and pre-profiling the grinding worm flanks by the additional zone.

22. The profiling gear according to claim 21, wherein the additional zone is coaxially spaced.

* * * * *